(12) United States Patent
Zazoum

(10) Patent No.: US 10,766,167 B1
(45) Date of Patent: Sep. 8, 2020

(54) METHOD OF FORMING THERMALLY AND ELECTRICALLY CONDUCTIVE POLYOLEFIN-CARBON NANOMATERIAL COMPOSITE HAVING BREAKDOWN-INDUCED ELECTRICAL CONDUCTION PATHWAYS

(71) Applicant: Prince Mohammad Bin Fahd University, Dhahran (SA)

(72) Inventor: Bouchaib Zazoum, Montreal (CA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 16/739,933

(22) Filed: Jan. 10, 2020

(51) Int. Cl.
| | | |
|---|---|---|
| *B29B 13/10* | (2006.01) | |
| *B29C 71/00* | (2006.01) | |
| *C01B 32/194* | (2017.01) | |
| *B82Y 40/00* | (2011.01) | |
| *C08L 23/06* | (2006.01) | |
| *C08K 3/04* | (2006.01) | |
| *B82Y 30/00* | (2011.01) | |

(52) U.S. Cl.
CPC .......... *B29B 13/10* (2013.01); *B29C 71/0081* (2013.01); *C01B 32/194* (2017.08); *C08K 3/042* (2017.05); *C08L 23/06* (2013.01); *B29K 2995/0005* (2013.01); *B29K 2995/0013* (2013.01); *B82Y 30/00* (2013.01); *B82Y 40/00* (2013.01); *C08K 2201/011* (2013.01); *C08L 2207/066* (2013.01)

(58) Field of Classification Search
CPC ..... B29C 71/0081; B82Y 30/00; B82Y 40/00; C08L 23/06; C08K 3/042; B29B 13/10; C01B 32/194

USPC ................. 252/500, 510, 511; 977/895, 897; 423/445 R, 460
See application file for complete search history.

(56) References Cited

U.S. PATENT DOCUMENTS

| | | | | |
|---|---|---|---|---|
| 2011/0040007 A1* | 2/2011 | Chandrasekhar | ........ | H01B 1/24 524/404 |
| 2012/0145315 A1* | 6/2012 | Knaapila | .................. | H01B 1/24 156/273.9 |

FOREIGN PATENT DOCUMENTS

| | | |
|---|---|---|
| CN | 101348587 B | 8/2011 |
| CN | 107200920 A | 9/2017 |
| CN | 108485055 A | 9/2018 |

(Continued)

OTHER PUBLICATIONS

Wu "Aligning multilayer graphene flakes with an external electric field to improve multifunctional properties of epoxy nanoconnposites."Carbon vol. 94, Nov. 2015, pp. 607-618 (Year: 2015).*

(Continued)

*Primary Examiner* — Tri V Nguyen
(74) *Attorney, Agent, or Firm* — Oblon, McClelland, Maier & Neustadt, L.L.P.

(57) ABSTRACT

A method of forming a polyolefin-carbon nanomaterial composite which contains oriented electrically conductive pathways. The method involves milling a polyolefin with particles of a carbon nanomaterial, molding to forma composite plate, and subjecting the composite plate to an AC voltage. The AC voltage forms oriented electrically conductive pathways by partial dielectric breakdown of the composite. The presence of the oriented electrically conductive pathways gives the polyolefin-carbon nanomaterial electrical and thermal conductivity higher than the polyolefin alone.

7 Claims, 4 Drawing Sheets

(56) References Cited

FOREIGN PATENT DOCUMENTS

CN           109680354 A    4/2019
WO    WO 2017/139078 A1    8/2017

OTHER PUBLICATIONS

Marplex LDPE MSDS from https://www.ixom.com/docs/default-source/db-product-data-sheets/plastics/alkateq-xds34p.pdf?sfvrsn=2 (Year: 2016).*

Andrea Pirondelli, et al., "Electric and thermal properties of polyethylene-based nanodielectrics containing graphene-like additives", IEEE Conference on Electrical Insulationand Dielectric Phenomena (CEIDP), Oct. 16-19, 2016, 2 pages (Abstract only).

Junwei Gu, et al., "High thermal conductivity graphite nanoplatelet/UHMWPE nanocomposites", RCE Advances, vol. 5, Issue 46, Mar. 27, 2015, pp. 36334-36339 (Abstract only).

Yingfei AN, et al., "Friction and wear properties of graphene oxide/ultrahigh-molecular-weight polyethylene composites under the lubrication of deionized water and normal saline solution", Journal of Applied Polymer Science, vol. 131, Issue 1, Aug. 12, 2013, 1 page (Abstract only).

* cited by examiner

METHOD OF FORMING THERMALLY AND ELECTRICALLY CONDUCTIVE POLYOLEFIN-CARBON NANOMATERIAL COMPOSITE HAVING BREAKDOWN-INDUCED ELECTRICAL CONDUCTION PATHWAYS

BACKGROUND OF THE INVENTION

Technical Field

The present invention relates to a method of preparing a polyolefin-carbon nanomaterial composite utilizing application of an AC voltage, and a polyolefin-carbon nanomaterial composite made by the method.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polyolefins have a number of properties that are advantageous for applications in a wide variety of products and industries such as consumer goods, packaging, medical products, and safety equipment. Specifically, the low electrical and thermal conductivity of polyolefins help to prevent the risk of electrical shock or thermal burns. The same low electrical and thermal conductivity, however, is disadvantageous for use in certain electronics applications where higher values of these properties are desirable.

A common strategy for changing the physical properties of polymers is to create polymer composites by blending other materials into the polymer matrix. Such composites may have altered characteristics such as dielectric permeability, electrical conductivity, Young's modulus, flexibility, toughness, degradation resistance, and others. The inclusion of nanomaterials into polyolefins is often done to enhance the electrically-insulating nature of the polyolefin. The incorporation of the nanomaterial causes an increase in the dielectric breakdown strength and a decrease in the dielectric permeability of the composite compared to the polyolefin alone [Ma, et. al., Nanotechnology, 2005, 16, 6, 724—incorporated herein by reference in its entirety]. This decrease in dielectric permeability and increased dielectric breakdown strength is attributed to the ability of the nanomaterial to change the spatial charge distribution in the polyolefin matrix and by reducing the internal electric field produced in the composite upon voltage application [Easaee, et. al., Journal of Nanomaterials, 2018, Article ID 7921725—incorporated herein by reference in its entirety]. Further, the dielectric breakdown strength of polyolefins is increased due to the ability of the nanomaterial to suppress "electrical treeing", the dendritic growth of electrically conductive pathways in the polyolefin matrix caused by partial dielectric breakdown [Tanaka, 2016, In: Polymer Nanocomposites, Huang X., Zhi C. (eds), Springer, Cham—incorporated herein by reference in its entirety]. The particles of the nanomaterial act as termination points for the electrically conductive pathways, suppressing the continued growth and branching.

A polyolefin-based composite with higher electrical and thermal conductivity compared to the polyolefin alone, however, would be advantageous for use in electronics applications. Such a composite could take advantage of the properties of the polyolefin such as flexibility, toughness, and degradation resistance and have the required electrical and thermal conductivities for applications such as batteries, solar cells, electrodes, or electronics packaging.

In view of the foregoing, one objective of the present invention is to provide a method for preparing a polyolefin-nanomaterial composite with electrical and thermal conductivity higher than the parent polyolefin by the incorporation of a carbon nanomaterial. It is a further objective of the present invention is to provide a nanocomposite material having electrically conductive pathways, e.g., formed from application of AC voltage.

BRIEF SUMMARY OF THE INVENTION

According to a first aspect, the present disclosure relates to a method of making a polyolefin-carbon nanomaterial composite comprising mixing a carbon nanomaterial with a polyolefin powder to form a mixture, ball milling the mixture in a high-energy shaker to form a composite powder, molding the composite powder to form a composite plate, and subjecting the composite plate to an AC voltage of 1 to 50 kV/mm to form the polyolefin-carbon nanomaterial composite.

In some embodiments, the AC voltage has a frequency of 50 to 70 Hz.

In some embodiments, the polyolefin-carbon nanomaterial composite comprises a polyolefin matrix, particles of a carbon nanomaterial uniformly distributed in the polyolefin matrix, and oriented electrically conductive pathways.

In some embodiments, the polyolefin matrix is present in the polyolefin-carbon nanomaterial composite in an amount of 90 to 99 wt %, and the carbon nanomaterial is present in the polyolefin-carbon nanomaterial composite in an amount of 1 to 10 wt %, each based on a total weight of the polyolefin-carbon nanomaterial composite.

In some embodiments, the AC voltage is applied by placing the composite plate on a supporting ground electrode and placing a needle electrode into the composite plate such that the needle electrode does not contact the supporting ground electrode and the supporting ground electrode and needle electrode are separated by a distance of at least 30% of a thickness of the composite plate.

In some embodiments, the supporting ground electrode, the composite plate, and the needle electrode are immersed in a non-conductive liquid medium during the subjecting.

In some embodiments, the oriented electrically conductive pathways comprise dendritic conductive channels in the polyolefin matrix which originate and terminate at at least one selected from the group consisting of an exterior surface of the composite, a channel created by the needle electrode, and a particle of the carbon nanomaterial.

In some embodiments, an oriented electrically conductive pathway, optionally together with one or more additional pathways and/or one or more particles of carbon nanomaterial, comprises a path along which electricity may flow that spans a thickness of the polyolefin-carbon nanomaterial composite.

In some embodiments, the polyolefin is polyethylene.

In some embodiments, the polyethylene is low density polyethylene.

In some embodiments, the low density polyethylene has a density of 0.88 to 0.96 g/cm$^3$ and a melt flow index of 0.3 to 0.5 g/10 minutes.

In some embodiments, the carbon nanomaterial is graphene nanoplatelets.

In some embodiments, the polyolefin-carbon nanomaterial composite has a thermal conductivity of 0.1 $Wm^{-1}K^{-1}$ to 500 $Wm^{-1}K^{-1}$ and an electrical conductivity of $10^{-12}$ S/m to $10^2$ S/m.

The current disclosure also relates to a polyolefin-carbon nanomaterial composite, comprising a polyolefin matrix in an amount of 90 to 99 wt %, based on a total weight of the polyolefin-carbon nanomaterial composite, carbon nanomaterial present in an amount of 1 to 10 wt %, based on a total weight of the polyolefin-carbon nanomaterial composite, and oriented electrically conductive pathways comprising either hollow channels in the polyolefin matrix or material formed from electrical damage of the polyolefin matrix that has a distinct chemical composition from the polyolefin matrix.

In some embodiments, the polyolefin matrix comprises polyethylene.

In some embodiments, the polyethylene is low density polyethylene.

In some embodiments, the low density polyethylene has a density of 0.88 to 0.96 g/cm$^3$ and a melt flow index of 0.3 to 0.5 g/10 minutes.

In some embodiments, the carbon nanomaterial is graphene nanoplatelets.

In some embodiments, the oriented electrically conductive pathways comprise dendritic conductive channels in the polyolefin matrix which originate and terminate at least one selected from the group consisting of an exterior surface of the composite, a channel created by the needle electrode, and a particle of the carbon nanomaterial.

In some embodiments, the polyolefin-carbon nanomaterial composite has a thermal conductivity of 0.1 $Wm^{-1}K^{-1}$ to 500 $Wm^{-1}K^{-1}$ and an electrical conductivity of $10^{-12}$ S/m to $10^2$ S/m.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
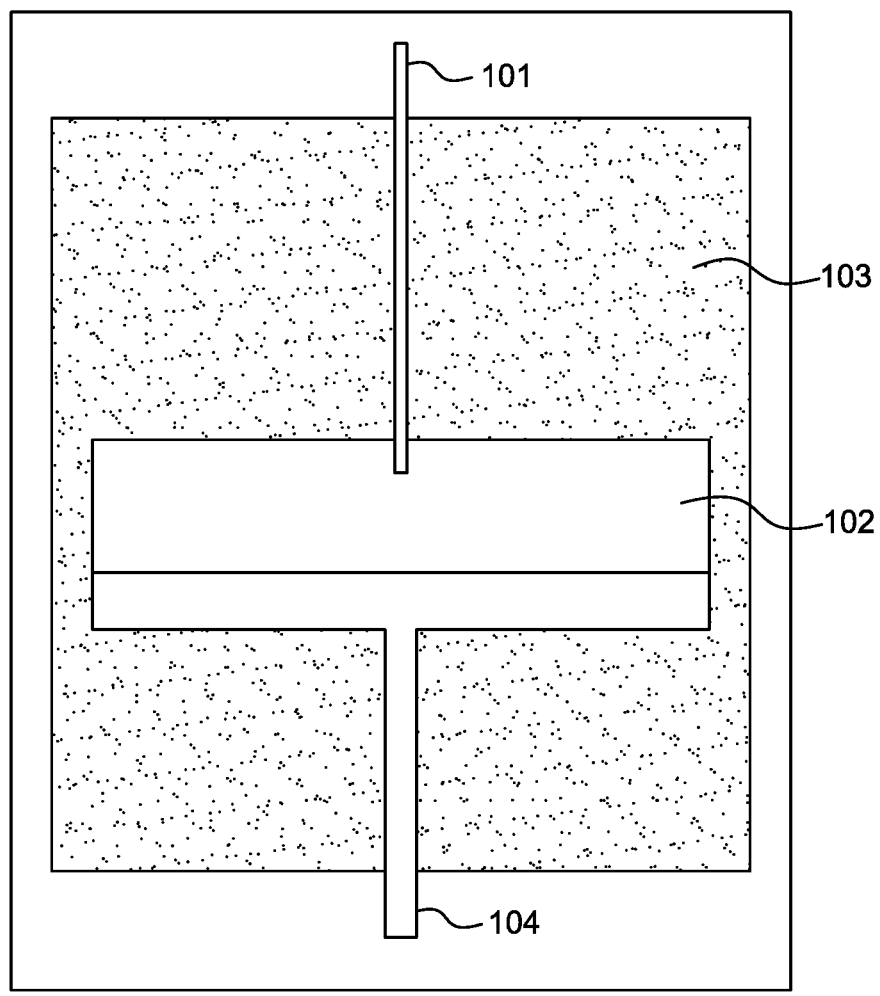
FIG. 1 is a schematic representation of the application of the AC voltage showing the needle electrode (101), composite plate (102), non-conductive liquid medium (103), and supporting ground electrode (104)

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "composite" refers to a combination of two or more distinct constituent materials into one continuous or discontinuous mass. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

According to a first aspect, the present disclosure relates to a method of making a polyolefin-carbon nanomaterial composite. The method involves first mixing a carbon nanomaterial with a polyolefin powder to form a mixture. In some embodiments, the polyolefin powder is present in an amount of 90 to 99 wt %, preferably 95 to 98 wt %, preferably 96 to 97.75 wt %, preferably 96.5 to 97.5 wt %, preferably 97 wt % based on a total weight of the mixture. In some embodiments, the carbon nanomaterial is present in an amount of 1 to 10 wt %, preferably 2 to 5 wt %, preferably 2.25 to 4 wt %, preferably 2.5 to 3.5 wt %, preferably 3 wt % based on a total weight of the mixture.

Examples of polyolefins include polyethylene, polypropylene, polymethylpentene, polybutene-1, polyisobutylene, polystyrene, polyvinyl chloride, polybutadiene, and the like. In some embodiments, the polyolefin in polyethylene. In some embodiments, the polyethylene is low-density polyethylene (LDPE). In preferred embodiments, the polyolefin is LDPE having a density of 0.88 to 0.96 g/cm$^3$, preferably 0.89 to 0.95 g/cm$^3$, preferably 0.90 to 0.94 g/cm$^3$, preferably 0.91 to 0.93 g/cm$^3$. In preferred embodiments, the polyolefin is LDPE having a melt flow index of 0.3 to 0.5 g/10 minutes, preferably 0.35 to 0.45 g/10 minutes, preferably 0.40 g/10 minutes. In some embodiments, the LPDE is in the form of particles having a particle size distribution wherein greater than 90% of particles, preferably greater than 91% of particles, preferably greater than 92% of particles, preferably greater than 93% of particles, preferably greater than 94% of particles, preferably greater than 95% of particles have a particle size less than 600 µm, preferably less than 575µ, preferably less than 550 µm, preferably less than 525 µm, preferably less than 500 µm.

The carbon nanomaterial may be carbon nanotubes, fullerenes, fullerene whiskers, carbon nanobuds, carbon nanoscrolls, activated carbon, carbon black, graphene, and the like. In some embodiments, the carbon nanomaterial is graphene. In some embodiments, the carbon nanomaterial is graphene nanoplatelets. Graphene nanoplatelets may consist of stacks of graphene sheets, the stacks having an average thickness and a diameter. In some embodiments, the graphene nanoplatelets have a thickness of 1.75 to 100 nm, preferably 2 to 50 nm, preferably 2.25 to 25 nm, preferably 2.75 to 20 nm, preferably 3 to 15 nm. In some embodiments, the graphene nanoplateltes a diameter of 10 nm to 100 µm, preferably 100 nm to 50 µm, preferably 250 nm to 10 µm, preferably 500 nm to 9 µm, preferably 750 nm to 7.5 µm, preferably 900 nm to 5 µm, preferably 1 to 2.5 µm, preferably 1.1 to 2.0 µm. In some embodiments, the graphene nanoplatelets have a monodisperse thickness, having a coefficient of variation or relative standard deviation, expressed as a percentage and defined as the ratio of the graphene nanoplatelet thickness standard deviation ($\sigma$) to the graphene nanoplatelet thickness mean ($\mu$), multiplied by 100%, of less than 25%, preferably less than 10%, preferably less than 8%, preferably less than 6%, preferably less than 5%. In a preferred embodiment, the graphene nanoplateltes have a monodisperse thickness, having a size distribution ranging from 80% of the average thickness to 120% of the average thickness, preferably 85 to 115%, preferably 90 to 110% of the average thickness. In another embodiment, the graphene nanoplatelets do not have a monodisperse thickness. In some embodiments, the graphene nanoplatelet have a monodisperse diameter, having a coefficient of variation or relative standard deviation, expressed as a percentage and defined as the ratio of the graphene nanoplatelet diameter standard deviation ($\sigma$) to the graphene nanoplatelet diameter mean ($\mu$), multiplied by 100%, of less than 25%, preferably less than 10%, preferably less than 8%, preferably less than 6%, preferably less than 5%. In a preferred embodiment, the graphene nanoplatelet have a monodisperse diameter, having a size distribution ranging from 80% of the average diameter to 120% of the average diameter, preferably 85 to 115%, preferably 90 to 110% of the average diameter. In another embodiment, the graphene nanoplatelets do not have a monodisperse diameter. In alternative embodiments, the graphene is in the form of graphene particles. In some embodiments, the graphene particles have an average particle size of 1 nm to 1000 µm, preferably 10 nm to 100 µm, preferably 100 nm to 50 µm, preferably 500 nm to 5 µm, preferably 750 nm to 2.5 µm. The graphene particles may have a spherical shape, or may be shaped like blocks, flakes, ribbons, discs, granules, sheets, angular chunks, rectangular prisms, or some other shape. Graphene flakes may be distinguished from graphene nanoplatelets by the thickness. Graphene nanoplatelets have a thickness of 1.75 to 100 nm, while graphene flakes have a thickness of 0.33 to 1.70 nm. The thickness of a graphene flake may not be uniform across the graphene flake. A graphene nanosheet may be distinguished from graphene flakes and graphene nanoplatelets in that graphene nanosheets consist of only a single layer of graphene, while flakes and nanoplatelets may contain more than one layer of graphene stacked on top of each other. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles are in the form of flakes, ribbons, discs, or sheets having a mean size in a range as previously described and having a largest dimension that is 50 to 500%, preferably 75 to 400, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the graphene particles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean size of the primary particles. The primary particles may be the graphene particles having a mean size as previously described. In some embodiments, the graphene particles are monodisperse, having a coefficient of variation or relative standard deviation, expressed as a percentage and defined as the ratio of the graphene particle size standard deviation ($\sigma$) to the graphene particle size mean ($\mu$), multiplied by 100%, of less than 25%, preferably less than 10%, preferably less than 8%, preferably less than 6%, preferably less than 5%. In a preferred embodiment, the graphene particles are monodisperse, having a graphene particle size distribution ranging from 80% of the average particle size to 120% of the average particle size, preferably 85 to 115%, preferably 90 to 110% of the average particle size. In another embodiment, the graphene particles are not monodisperse.

In some embodiments, the graphene particles have a surface area of 500 to 1000 $m^2/g$, preferably 550 to 950 $m^2/g$, preferably 600 to 900 $m^2/g$, preferably 650 to 850 $m^2/g$, preferably 700 to 800 $m^2/g$, preferably 725 to 775 $m^2/g$, preferably 740 to 760 $m^2/g$, preferably 750 $m^2/g$. In some embodiments, the graphene particles have a bulk density of 0.05 to 0.75 $g/cm^3$, preferably 0.1 to 0.65 $g/cm^3$, preferably 0.125 to 0.55 $g/cm^3$, preferably 0.15 to 0.5 $g/cm^3$, preferably 0.175 to 0.4.5 $g/cm^3$, preferably 0.2 to 0.4 $g/cm^3$.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene.

The mixing may be performed using equipment such as a V blender, a ribbon blender, a twin-screw continuous blender, a single screw blender, a double cone blender, a planetary mixer, a double planetary mixer, a paddle mixer, a tumbling mixer, a drum blender, a horizontal mixer, or the like.

The method next involves optionally milling the mixture to form a composite powder. The mixture may be milled by a technique such as milling, grinding, ball milling, chopping, pulverizing, crushing, pounding, mincing, shredding, smashing, fragmenting, or another technique that may be used to reduce a material to small particles. In some embodiments, the milling may take place using a mill, ball mill, rod mill, autogenous mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. In some embodiments, the milling is ball milling. In some embodiments, the ball milling takes place in a high-energy ball mill. Non-limiting examples of milling media (i.e. bowl and balls) include zirconium dioxide, tungsten carbide, silicon nitride, and alumina. In one embodiment, zirconium dioxide milling media is employed to minimize contamination of the powder mixture. The balls used for milling may have a diameter of 200 to 1,000 µm, preferably 300 to 900 µm, preferably 400 to 800 µm, preferably 600 to 650 µm, though balls with diameters smaller than 200 µm, or greater than 1,000 µm, may be used. In one embodiment, a weight ratio of the balls to the powder mixture ranges from 4:1 to 35:1, preferably from 5:1 to 30:1, preferably from 7.5:1 to 25:1, preferably from 9:1 to 15:1. In some embodiments, the milling is performed in an inert atmosphere, preferably provided by inert gas such as argon gas, though in another embodiment, the milling may be performed in air. In some embodiments, the milling is performed at ambient temperature (i.e. 23 to 26° C.). The mixture may be milled for up to 10 hours, or up to 5 hours, or up to 2 hours, preferably for 10 to 90 minutes, preferably for 30 to 75 minutes, preferably for 35 to 50 minutes, preferably for 40 minutes. A high-energy ball milling apparatus may use a rotation rate of 500 to 10,000 rpm, preferably 750 to 5,000 rpm, preferably 1,000 to 3,250 rpm, preferably 1,025 to 2,500 rpm, preferably 1,050 to 2,000 rpm. Preferably, the ball milling decreases the size of the particles by 30-95%, preferably 40-90%, more preferably 60-90% relative to a size of the particles before the ball milling.

In some embodiments, the composite powder comprises particles of polyolefin and particles of carbon nanomaterial. In some embodiments, the particles of polyolefin have a particle size of 1 nm to 1000 µm, preferably 10 nm to 500 µm, preferably 100 nm to 100 µm, preferably 500 nm to 50 µm. In some embodiments, the particles of polyolefin may have a spherical shape, or may be shaped like cylinders, boxes, blocks, spikes, flakes, plates, ellipsoids, toroids, stars, ribbons, discs, rods, granules, prisms, cones, platelets, sheets, angular chunks, cubes, rectangular prisms, or some other shape. In some embodiments, the particles of polyolefin may be substantially spherical, meaning that the distance from the particle centroid (center of mass) to anywhere on the particle outer surface varies by less than 30%, preferably by less than 20%, more preferably by less than 10% of the average distance. In some embodiments, the particles of polyolefin are in the form of blocks, granules, rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150, preferably 10 to 125, preferably 15 to 100, preferably 25 to 75% of the range previously described. In some embodiments, the particles of polyolefin are monodisperse, having a coefficient of variation or relative standard deviation, expressed as a percentage and defined as the ratio of the particle size standard deviation ($\sigma$) to the particle size mean ($\mu$), multiplied by 100%, of less than 25%, preferably less than 10%, preferably less than 8%, preferably less than 6%, preferably less than 5%. In a preferred embodiment, the particles of polyolefin are monodisperse, having a particle size distribution ranging from 80% of the average particle size to 120% of the average particle size, preferably 85 to 115%, preferably 90 to 110% of the average particle size. In another embodiment, the particles of polyolefin are not monodisperse.

The method next involves molding the composite powder to form a composite plate. In some embodiments, the molding is performed with via blow molding, compression molding, extrusion molding, injection molding, laminating, matrix molding, rotational molding, spin casting, transfer molding, thermoforming, vacuum forming, or a similar technique known by one of ordinary skill in the art. In some embodiments, the molding is compression molding. In preferred embodiments, the compression molding is performed with a hot press mold. In some embodiments, the temperature of the compression molding is 30 to 177° C., preferably 35 to 172° C., preferably 40 to 167° C., preferably 50 to 162° C., preferably 80 to 160° C., preferably 100 to 155° C., preferably 125 to 152.5° C., preferably 150° C. In some embodiments, the compression molding is performed at a pressure of 0.01 bar to 150 bar, preferably 0.1 bar to 100 bar, preferably 0.15 bar to 75 bar, preferably 0.25 bar to 50 bar, preferably 0.4 bar to 25 bar, preferably 0.5 bar to 15 bar. In some embodiments, the compression molding involves application of pressure for 1 to 20 minutes, preferably 2 to 19 minutes, preferably 3 to 18 minutes, preferably 4 to 17 minutes, preferably 5 to 15 minutes. In some embodiments, the compression molding comprises two steps performed at different pressures in the range specified above, each step lasting a time in the range specified above. In some embodiments, the first step is performed at a pressure of 0.1 to 0.9 bar, preferably 0.2 to 0.8 bar, preferably 0.3 to 0.7 bar, preferably 0.4 to 0.6 bar, preferably 0.45 to 0.55 bar, preferably 0.5 bar for 1 to 20 minutes, preferably 2.5 to 17.5 minutes, preferably 5 to 15 minutes, preferably 7.5 to 12.5 minutes, preferably 10 minutes. In some embodiments, the second step is performed at a pressure of 10 to 150 bar, preferably 11 to 100 bar, preferably 12 to 75 bar, preferably 13 to 50 bar, preferably 14 to 25 bar, preferably 14.5 to 15.5 bar, preferably 15 bar for 1 to 20 minutes, preferably 2 to 15 minutes, preferably 3 to 10 minutes, preferably 4 to 7.5 minutes, preferably 5 minutes. The composite plate comprises a polyolefin matrix and particles of carbon nanomaterial. In some embodiments, the particles of carbon nanomaterial are uniformly distributed throughout the polyolefin matrix. In some embodiments, the particles of polyolefin present in the composite powder are formed into the polyolefin matrix of the composite plate by sintering of the particles of polyolefin. In alternative embodiments, the particles of polyolefin present in the composite powder are formed into the polyolefin matrix of the composite plate by melting of the particles of polyolefin. In preferred embodiments, the composite plate has a thickness of 1 µm to 100 mm, preferably 10 µm to 50 mm, preferably 100 µm to 25 mm.

The composite plate is then subjected to an AC voltage to form the polyolefin-carbon nanomaterial composite. In some embodiments, the AC voltage is 1 to 50 kV, preferably 2.5 to 47.5 kV, preferably 5 to 45 kV, preferably 7.5 to 42.5 kV, preferably 10 to 40 kV. The AC voltage applied is below the breakdown voltage of the polyolefin. In preferred embodiments, the AC voltage has a frequency of 50 to 70 Hz, preferably 55 to 65 Hz, preferably 60 Hz. In some embodiments, the AC voltage is applied by placing the composite plate on a supporting ground electrode and placing a needle electrode into the composite plate such that the needle electrode does not contact the supporting ground electrode (a situation which would result in a short circuit). In some embodiments, the supporting ground electrode and needle electrode are separated by a distance of at least 30%, preferably at least 40%, preferably at least 50%, preferably at least 55%, preferably at least 60%, preferably at least 70%, preferably at least 75%, preferably at least 80%, preferably at least 85%, preferably at least 90% of a thickness of the composite plate. In some embodiments, the supporting ground electrode, composite plate, and needle electrode are immersed in a non-conductive liquid medium during the subjecting. Examples of non-conductive liquid media for the aforementioned subjecting include silicon oil, mineral oil, vegetable oil, non-conductive coolant, glycerol, ethylene glycol, propylene glycol, and the like, but excluding distilled water. In some embodiments, the non-conductive liquid medium is mineral oil.

The applied AC voltage induces electrical damage or partial dielectric breakdown in the polyolefin matrix. In some embodiments, the electrical damage or partial dielectric breakdown is a voltage-induced phenomenon. In some embodiments, current may flow from the needle electrode to the supporting ground electrode, but such a current is not necessary for the electrical damage or partial dielectric breakdown. In some embodiments, the applied AC voltage induces electrical damage or partial dielectric breakdown without a flow of current between the electrodes. This electrical damage causes the formation of electrically conductive pathways. Initially, these electrically conductive pathways form at the needle electrode and propagate outward from the needle electrode. As these electrically conductive pathways propagate, the pathways branch and form a dendritic structure beginning at the site of the needle electrode and traveling outward from it in a direction generally toward the supporting ground electrode. The direction generally toward the supporting ground electrode may be characterized as a cone the sides of which encompass the entirety of the electrically conductive pathways and described by an angle at which the sides meet. In some embodiments, the cone has an angle of less than 180°, preferably less than 150°, preferably less than 120°, preferably less than 90°, preferably less than 60°. In some embodiments, the ratio of the maximum horizontal distance from the needle electrode to an electrically conductive pathway to the maximum vertical distance from the needle electrode to an electrically conductive pathway is 1:1 to 1:100, preferably 1:2 to 1:90, preferably 1:3 to 1:80, preferably 1:4 to 1:75, preferably 1:5 to 1:60, preferably 1:6 to 1:50, preferably 1:7 to 1:40, preferably 1:8 to 1:35, preferably 1:9 to 1:30, preferably 1:10 to 1:25. As used herein, horizontal means in a direction perpendicular to the direction of the shortest line spanning from the needle electrode to the supporting ground electrode. As used herein, vertical means in a direction parallel to the direction of the shortest line spanning from the needle electrode to the supporting ground electrode. The above description of the direction generally toward the supporting ground electrode defines the orientation of the electrically conductive pathways and the preferential propagation in a direction parallel to the direction of the shortest line spanning from the needle electrode to the supporting ground electrode compared to the propagation in a direction perpendicular to the direction of the shortest line imagined spanning from the needle electrode to the supporting ground electrode makes the electrically conductive pathways oriented electrically conductive pathways and distinct from non-oriented electrically conductive pathways, which would be characterized by isotropic propagation outward from the needle electrode. The shape of the dendritic structure of the oriented electrically conductive pathways is also known as a "lightning tree" or "Lichtenberg figure".

In some embodiments, the oriented electrically conductive pathways are comprised of hollow channels in the polyolefin matrix. In some embodiments, the oriented electrically conductive pathways are comprised of material formed from electrical damage or partial dielectric breakdown of the polyolefin matrix that has a distinct composition from the polyolefin matrix. Such distinction may come in the form of a different crystallinity or percent crystallinity, a different average chain length, a different percent crosslinking, a different crosslinking density, oxidation of the polyolefin, carbonization of the polyolefin, charring of the polyolefin, combustion of the polyolefin, or depolymerization of the polyolefin. In some embodiments, the application of the AC voltage results in melting of the polyolefin matrix localized to the oriented electrically conductive pathways. Such melting may change the properties of the polyolefin such as different crystallinity or percent crystallinity, percent crosslinking, or crosslinking density of the polyolefin. In some embodiments, the application of the AC voltage results in changes to the chemical structure of the polyolefin such as oxidation, carbonization, charring, combustion, or depolymerization of the polyolefin. In some embodiments, the aforementioned changes to the chemical structure of the polyolefin are the result of thermal processes. In some embodiments, the aforementioned changes to the chemical structure of the polyolefin are the result of electrochemical processes. In some embodiments, the aforementioned changes to the chemical structure of the polyolefin are the result of both thermal and electrochemical processes. The oriented electrically conductive pathways may originate at either the site of the needle electrode, branch from an existing oriented electrically conductive pathway, or from a particle of the carbon nanomaterial embedded in the polyolefin matrix. The oriented electrically conductive pathways may terminate at either a particle of the carbon nanomaterial embedded in the polyolefin matrix or a surface of the nanocomposite. In some embodiments, a single oriented electrically conductive pathway, acts as a portion of a path along which electricity may flow, the path comprising at least one oriented electrically conductive pathway and optionally comprising one or more additional oriented electrically conductive pathways and/or one or more particles of carbon nanomaterial.

In some embodiments, the number and extent of the oriented electrically conductive pathways may be changed by the duration of the subjecting of the composite to the AC voltage. In some embodiments, the maximum distance from the end of the needle electrode to the end of an oriented electrically conductive pathway is 1 to 5 mm, preferably 1.5 to 4.5 mm, preferably 2 to 4 mm, preferably 2.1 to 3.9 mm, preferably 2.2 to 3.8 mm, preferably 2.3 to 3.7 mm, preferably 2.4 to 3.6 mm, preferably 2.5 to 3.5 mm, preferably 2.6 to 3.4 mm, preferably 2.7 to 3.3 mm, preferably 2.8 to 3.2 mm, preferably 2.9 to 3.1 mm after subjecting the composite to the AC voltage for a duration of 500 to 1500 seconds, preferably 550 to 1450 seconds, preferably 600 to 1400 seconds, preferably 650 to 1350 seconds, preferably 700 to 1300 seconds, preferably 750 to 1250 seconds, preferably 800 to 1200 seconds, preferably 850 to 1150 seconds, preferably 900 to 1100 seconds, preferably 1000 to 1050 seconds, preferably 1025 seconds. In some embodiments, increasing the number and extent of the oriented electrically conductive pathways increases the electrical and/or thermal conductivity of the polyolefin-carbon nanomaterial composite. In some embodiments, increasing the number and extent of the oriented electrically conductive pathways has disadvantageous effects on other properties of the polyolefin-carbon nanomaterial composite such as the Young's modulus, toughness, ductility, and % elongation. In some embodiments, the subjecting of the AC voltage is performed for a time to achieve desired electrical conductivity, thermal conductivity, Young's modulus, toughness, ductility, and % elongation of the polyolefin-carbon nanomaterial composite.

This method may be distinguished from method for determining the breakdown voltage of a polymer or polymer composite using a needle electrode and a supporting ground electrode in the following ways. First, to determine a voltage at which total electrical breakdown occurs, a voltage at least equal to the breakdown voltage must be applied. While lower voltages are necessarily applied before reaching the breakdown voltage, a method for determining the breakdown voltage continues to apply higher voltages until total electrical breakdown occurs. The method described here, however, relies on voltages below the breakdown voltage for the polyolefin. The voltage is high enough to cause electrical damage to the polyolefin, but is not high enough to cause total dielectric breakdown. Second, the method described here is reliant on tailoring the number and extent of the electrically conductive pathways present in the material to achieve a desired value of electrical and/or thermal conductivity. Thus, it is advantageous to control the number and extent of the electrically conductive pathways present in the polyolefin-carbon nanomaterial composite in order to balance the advantageous effects these pathways have on the electrical and thermal conductivity of the composite with the disadvantageous effects these pathways may have on other properties of the composite such as the Young's modulus, toughness, ductility, and % elongation. A method for determining the breakdown voltage has no need to take these other properties into account and would be rendered useless if the method was aborted before total dielectric breakdown occurred because of a change in a property such as toughness.

In some embodiments, the polyolefin-carbon nanomaterial composite has a thermal conductivity thermal conductivity of 0.1 $Wm^{-1}K^{-1}$ to 500 $Wm^{-1}K^{-1}$, preferably 0.2 $Wm^{-1}K^{-1}$ to 400 $Wm^{-1}K^{-1}$, preferably 0.3 $Wm^{-1}K^{-1}$ to 300 $Wm^{-1}K^{-1}$, preferably 0.4 $Wm^{-1}K^{-1}$ to 200 $Wm^{-1}K^{-1}$, preferably 0.5 $Wm^{-1}K^{-1}$ to 150 $Wm^{-1}K^{-1}$, preferably 0.6 $Wm^{-1}K^{-1}$ to 100 $Wm^{-1}K^{-1}$. In some embodiments, the polyolefin-carbon nanomaterial composite has an electrical conductivity of $10^{-12}$ S/m to $10^2$ S/m, preferably $10^{-11}$ to $10^1$ S/m, preferably $10^{-10}$ S/m to $10^0$ S/m, preferably $10^{-9}$ S/m to $10^{-1}$ S/m, preferably $10^{-8}$ S/m to $10^{-2}$ S/m.

According to a second aspect, the present disclosure relates to a polyolefin-carbon nanomaterial composite. The composite comprises a polyolefin matrix, carbon nanomaterial, and oriented electrically conductive pathways formed from partial electrical damage of the polyolefin matrix. In some embodiments, the polyolefin matrix is present in an amount of 90 to 99 wt %, preferably 95 to 98 wt %, preferably 96 to 97.75 wt %, preferably 96.5 to 97.5 wt %, preferably 97 wt % based on a total weight of the composite. In some embodiments, the carbon nanomaterial is present in an amount of 1 to 10 wt %, preferably 2 to 5 wt %, preferably 2.25 to 4 wt %, preferably 2.5 to 3.5 wt %, preferably 3 wt % based on a total weight of the composite.

In some embodiments, the polyolefin is polyethylene as described above. In some embodiments, the polyethylene is low-density polyethylene (LDPE) as described above. In preferred embodiments, the polyolefin is LDPE having a density as described above. In preferred embodiments, the polyolefin is LDPE having a melt flow index as described above.

The carbon nanomaterial may be carbon nanotubes, fullerenes, fullerene whiskers, carbon nanobuds, carbon nanoscrolls, activated carbon, carbon black, graphene, and the like as described above. In some embodiments, the carbon nanomaterial is graphene as described above. In some embodiments, the carbon nanomaterial is graphene nanoplatelets as described above. In alternative embodiments, the graphene is in the form of graphene particles as described above. In some embodiments, the graphene is pristine graphene as described above. In alternative embodiments, the graphene is functionalized graphene as described above. In other alternative embodiments, the graphene is reduced graphene oxide as described above.

The electrically conductive channels take the form of a dendritic structure beginning at the site of the needle electrode and traveling outward from it in a direction generally toward the supporting ground electrode as described above.

In some embodiments, the oriented electrically conductive pathways are comprised of hollow channels in the polyolefin matrix as described above. In some embodiments, the oriented electrically conductive pathways are comprised of material formed from full or partial dielectric damage of the polyolefin matrix that has a distinct chemical composition from the polyolefin matrix as described above. In some embodiments, a single oriented electrically conductive pathway, acts as a portion of a path along which electricity may flow, the path comprising at least one oriented electrically conductive pathway and optionally comprising one or more additional oriented electrically conductive pathways and/or one or more particles of carbon nanomaterial as described above.

In some embodiments, the polyolefin-carbon nanomaterial composite has a thermal conductivity thermal conductivity as described above In some embodiments, the polyolefin-carbon nanomaterial composite has an electrical conductivity as described above.

The examples below are intended to further illustrate protocols for preparing, characterizing the polyolefin-carbon nanomaterial composite and uses thereof, and are not intended to limit the scope of the claims.

EXAMPLES

Preparation of the Composite Block

A polyethylene/graphene composite was prepared by a ball milling process. First, graphene nanoplatelets were manually premixed into polyethylene powder. The mixture consisted of 97 wt % of polyethylene with 3 wt % of graphene nanoplatelets. The graphene nanoplatelets were purchased from Sigma Aldrich and had an average flake size less than 2 μm, an average thickness of less than 25 nm, a surface area of 750 $m^2$/g, and a bulk density of 0.2 to 0.4 g/cm³. The polyethylene was an additive free, low density polyethylene (LDPE) powder having a density of 0.922 g/cm³, melt flow index of 0.4 g/10 min and a typical particle size distribution with 95% of particles less than 500 µm, purchased from Marplex Australia. The powder mixture was then ball milled in a high-energy shaker mill. Milling was performed in a zirconium oxide crucible with a weight ratio of balls to powder mixture of 10:1. Milling was performed in air at ambient temperature (23° C.) at a rotation rate of 1050 to 2000 rpm. Total milling time was 40 minutes. The obtained nanocomposites powder is press-molded to form thin blocks using a hot press and then, a sharp needle is casted into polyethylene composite block to form a needle electrode geometry. The press-molding was performed at a temperature of 150° C. The press-molding used a two-step process, the first step pressing at 0.5 bar for 10 minutes, and the second step pressing at 15 bar for 5 minutes. The polyethylene composite block had a width of 30 mm, a height of 30 mm, and a thickness of 10 mm. The separation between the electrodes was 3 mm.

Application of the AC Voltage

The complete setup was immersed in mineral oil. Subsequently, a constant AC high voltage of 20 kV and 60 Hz was applied between the sharp needle and the plane (ground) electrode. A depiction of the setup used for the application of the AC voltage is shown in FIG. 1, with the needle electrode (101), composite plate (102), non-conductive liquid medium (103), and supporting ground electrode (104) visible.

Figure 2A:
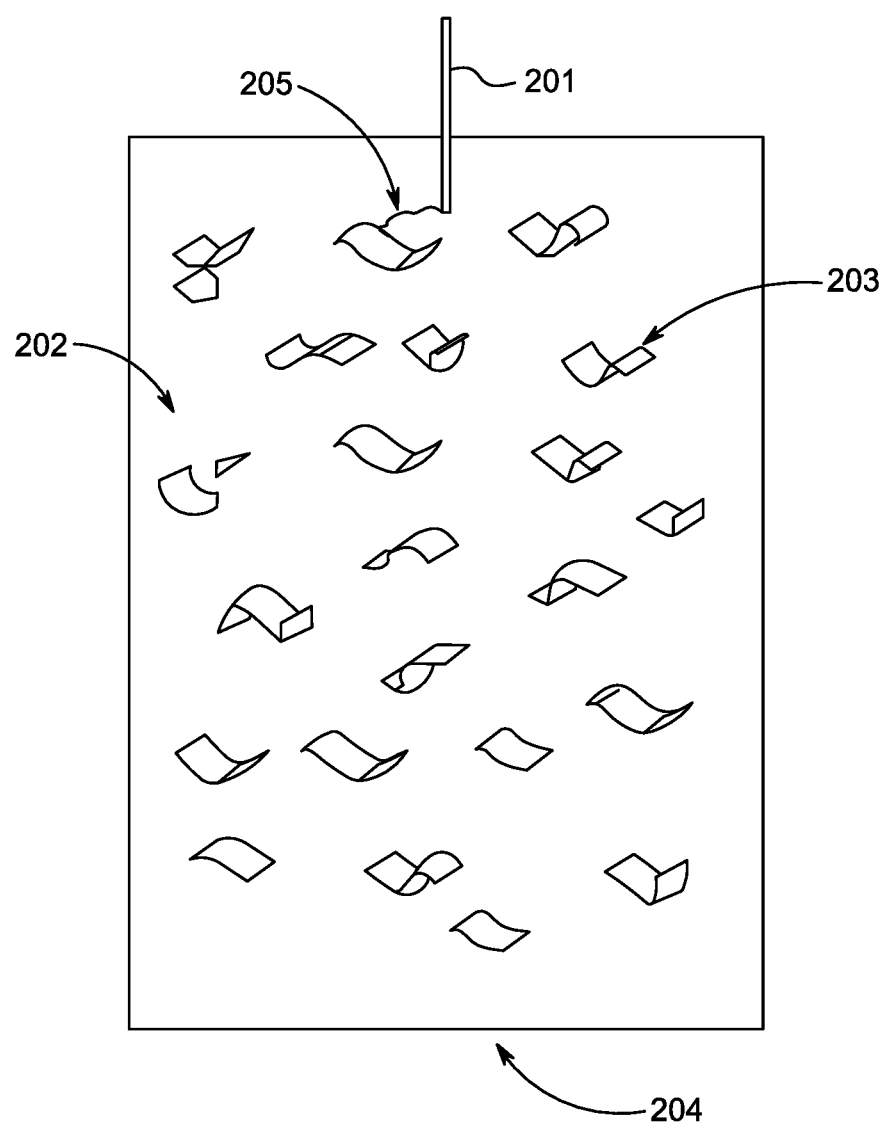
FIG. 2A shows the initiation of an oriented electrically conductive pathway (205) at the site of the needle electrode (201) under application high AC voltage.
Figure 2B:
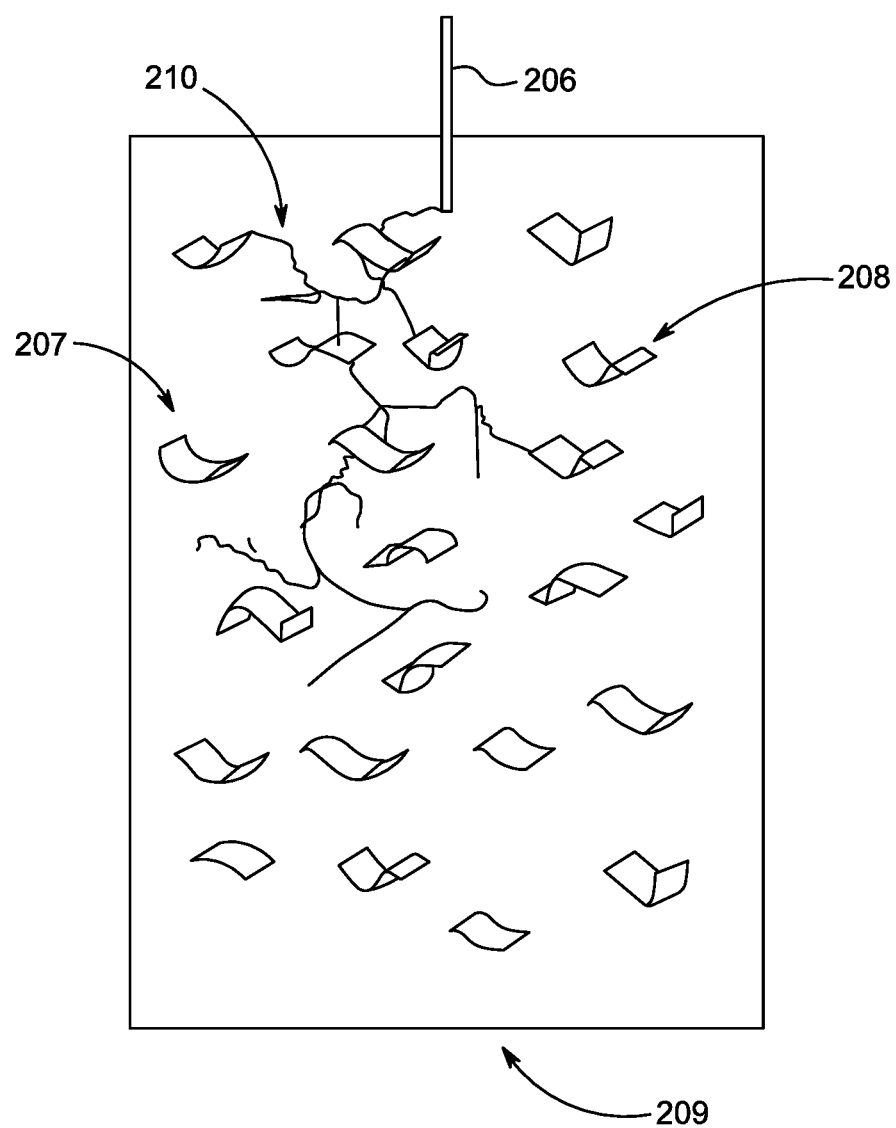
FIG. 2B shows propagation and branching of an oriented electrically conductive pathway (210) and the beginning formation of the dendritic structure of the oriented electrically conductive pathways.
Figure 2C:
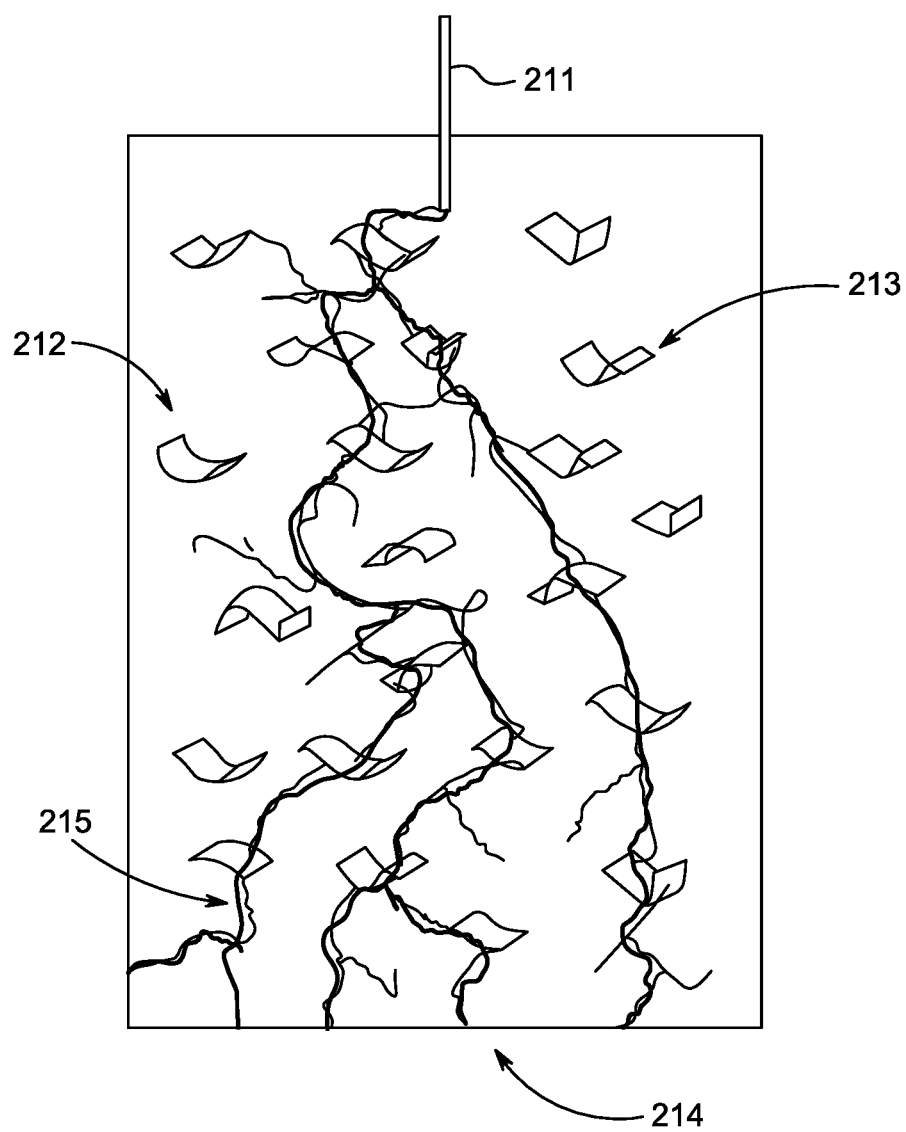
FIG. 2C shows complete formation of dendritic structure of the oriented electrically conductive pathways with complete paths along which electricity may flow (215).

FIGS. 2A-2C depict the possible mechanism of tree growth in the polymer matrix filled with graphene. The needle electrode (201) is shown embedded in the polyolefin matrix (202) with graphene nanoplatelets (203) dispersed in it and supported by the supporting ground electrode (204). Over a period of time, high local electric stress leads to the formation of the conducting channel (205), which could initiate the electrical tree from the needle (FIG. 2A). After propagating from the needle electrode (206), through the polymer matrix (207), along the graphene nanoplatelets interface (208), but not yet reaching the supporting ground electrode (209), the conductive trees (210) propagate to another graphene particle through the polymer matrix (FIG. 2B). After propagating from the needle electrode (211), through the polymer matrix (212), along the graphene nanoplatelets interface (213), and after reaching the supporting ground electrode (214), the conductive trees (210) bridge the gaps between graphene nanoplatelets and form a plurality of oriented electrically conductive pathways (215) which leads to an improvement in the electrical and thermal conductivity of the polymer composite (FIG. 2C).

The final electrical and thermal conductivity of the composite can be tuned by controlling the time ($t_i$) of the applied high voltage. As $t_i$ increases the number of propagated trees increases leading to an improved electrical conductivity. The tress had an average growth rate of 0.0029 mm/sec. Total time of the applied high voltage was 1025 to 1027 seconds for a sample with electrode separation of 3 mm.

To reach high electrical conductivity and protect the nanocomposite material from total dielectric breakdown, the applied voltage should be stopped a few seconds before the dielectric breakdown takes place.

The invention claimed is:

1. A method of making a polyolefin-carbon nanomaterial composite, comprising:
   mixing graphene nanoplatelets with a low density polyethylene powder to form a mixture, wherein 95 wt % of the particles of the polyethylene powder have a particle size of less than 500 µm,
   ball milling the mixture in a high-energy shaker to form a composite powder,
   molding the composite powder to form a composite plate, and
   subjecting the composite plate to an AC voltage of 1 to 50 kV to form the polyolefin-carbon nanomaterial composite, wherein the AC voltage is applied to the composite plate through a needle electrode disposed inside the composite plate while the composite plate is disposed on a supporting ground electrode such that the needle electrode does not contact the supporting ground electrode and the supporting ground electrode and the needle electrode are separated by a distance of at least 30% of a thickness of the composite plate, and the supporting ground electrode, the composite plate, and the needle electrode are immersed in a non-conductive liquid medium,
   wherein the polyolefin-carbon nanomaterial composite has oriented electrically and thermally conductive pathways that comprise dendritic conductive channels in the polyethylene matrix which terminate at and originate from at least one selected from the group consisting of an exterior surface of the polyolefin-carbon nanomaterial composite, a channel created by the needle electrode, and a graphene nanoplatelet.

2. The method of claim 1, wherein the oriented electrically and thermally conductive pathways span a thickness of the polyolefin-carbon nanomaterial composite.

3. The method of claim 1, wherein the AC voltage has a frequency of 50 to 70 Hz.

4. The method of claim 1, wherein the polyolefin-carbon nanomaterial composite comprises a polyethylene matrix with particles of the graphene nanoplatelets uniformly distributed in the polyethylene matrix, and oriented along the electrically and thermally conductive pathways.

5. The method of claim 1, wherein the polyethylene matrix is present in the polyolefin-carbon nanomaterial composite in an amount of 90 to 99 wt %, and the graphene nanoplatelets are present in the polyolefin-carbon nanomaterial composite in an amount of 1 to 10 wt %, each based on a total weight of the polyolefin-carbon nanomaterial composite.

6. The method of claim 1, wherein the polyethylene has a density of 0.88 to 0.96 g/cm³ and a melt flow index of 0.3 to 0.5 g/10 minutes.

7. The method of claim 1, wherein the polyolefin-carbon nanomaterial composite has a thermal conductivity of 0.1 Wm⁻¹K⁻¹ to 500 Wm⁻¹K⁻¹ and an electrical conductivity of $10^{-12}$ S/m to $10^2$ S/m.

* * * * *